(12) United States Patent
Bjorn et al.

(10) Patent No.: US 6,950,539 B2
(45) Date of Patent: Sep. 27, 2005

(54) CONFIGURABLE MULTI-FUNCTION TOUCHPAD DEVICE

(75) Inventors: Vance C. Bjorn, Palo Alto, CA (US); Serge J. Belongie, Berkeley, CA (US)

(73) Assignee: Digital Persona, Redwood City, CA (US)

( * ) Notice: Subject to any disclaimer, the term of this patent is extended or adjusted under 35 U.S.C. 154(b) by 0 days.

(21) Appl. No.: 09/153,782

(22) Filed: Sep. 16, 1998

(65) Prior Publication Data

US 2002/0054695 A1 May 9, 2002

(51) Int. Cl.$^7$ .................................................. G06K 9/00
(52) U.S. Cl. ........................ 382/124; 382/115; 345/157
(58) Field of Search ................. 382/115–116, 124–127; 345/156, 157, 163; 356/71; 340/5.81–5.53

(56) References Cited

U.S. PATENT DOCUMENTS

| | | | |
|---|---|---|---|
| 3,419,287 A | 12/1968 | Rudie | 283/7 |
| 3,872,438 A | 3/1975 | Cuttill et al. | 340/149 A |
| 3,959,884 A | 6/1976 | Jordan et al. | 340/146.3 |
| 4,047,154 A | 9/1977 | Vitols et al. | 340/146.3 |
| 4,151,512 A | 4/1979 | Riganati et al. | 340/146.3 |
| 4,156,230 A | 5/1979 | Riganati et al. | 340/146.3 |
| 4,185,270 A | 1/1980 | Fischer II et al. | 340/146.3 |
| 4,208,651 A | 6/1980 | McMahon | 340/146.3 |
| 4,210,899 A | 7/1980 | Swonger et al. | 340/146.3 |
| 4,225,850 A | 9/1980 | Chang et al. | 340/146.3 |
| 4,253,086 A | 2/1981 | Szwarcbier | 340/146.3 |
| 4,260,979 A | 4/1981 | Smith | 340/146.3 |
| 4,414,684 A | 11/1983 | Blonder | 382/4 |
| 4,449,189 A | 5/1984 | Feix et al. | 364/513.5 |
| 4,454,610 A | 6/1984 | Sziklai | 382/3 |
| 4,525,859 A | 7/1985 | Bowles et al. | 382/5 |
| 4,581,760 A | 4/1986 | Schiller et al. | 382/4 |
| 4,607,384 A | 8/1986 | Brooks | 382/4 |
| 4,618,988 A | 10/1986 | Schiller | 382/5 |
| 4,636,622 A | 1/1987 | Clark | 235/380 |
| 4,641,350 A | 2/1987 | Bunn | 382/4 |
| 4,646,352 A | 2/1987 | Asai et al. | 382/5 |
| 4,685,145 A | 8/1987 | Schiller | 382/52 |
| 4,696,046 A | 9/1987 | Schiller | 382/5 |

(Continued)

FOREIGN PATENT DOCUMENTS

| | | | |
|---|---|---|---|
| DE | 4125198 | 5/1992 | ......... G06K/19/073 |
| EP | 0159037 | 10/1985 | ............ G07C/9/00 |
| GB | 1283748 | 8/1972 | ............ G07D/9/00 |
| GB | 2312040 | * 10/1997 | ........... G06K/11/18 |
| JP | 04158434 A | 6/1992 | |
| JP | 5089324 | 8/1993 | ............ G07D/9/00 |
| WO | 8203286 | 9/1982 | ........... G07C/11/00 |
| WO | 97/29477 A | 8/1997 | |
| WO | 97/43607 A | 11/1997 | |
| WO | 98/11501 | * 3/1998 | ............ G06K/9/00 |
| WO | 9107728 | 5/1998 | ............ G06K/9/00 |

OTHER PUBLICATIONS

Int'l Search Report for PCT/US99/20546 mailed Feb. 2, 2000, 4 pages.
European Search Report Patent No. 99969165.2–1527–US9920546, mailed Nov. 2, 2004.

*Primary Examiner*—Yon J. Couso
(74) *Attorney, Agent, or Firm*—Blakely, Sokoloff, Taylor & Zafman

(57) ABSTRACT

A touchpad device comprised of a detection array having a detection surface, wherein the detection surface is configured to receive a fingerprint image. Additionally, a processing device is provided to receive the fingerprint image or image data from the detection array. The processing device configures the touchpad device to operate as a pointer control device or a fingerprint recognition device based upon parameters associated with the fingerprint image.

31 Claims, 6 Drawing Sheets

U.S. PATENT DOCUMENTS

| | | | |
|---|---|---|---|
| 4,698,751 A | 10/1987 | Parvin | 364/200 |
| 4,723,298 A | 2/1988 | Schiller | 382/56 |
| 4,747,147 A | 5/1988 | Sparrow | 382/4 |
| 4,752,966 A | 6/1988 | Schiller | 382/5 |
| 4,777,651 A | 10/1988 | McCann et al. | 382/21 |
| 4,787,742 A | 11/1988 | Schiller et al. | 356/71 |
| 4,790,564 A | 12/1988 | Larcher et al. | 283/69 |
| 4,805,223 A | 2/1989 | Denyer | 382/4 |
| 4,811,414 A | 3/1989 | Fishbine et al. | 382/52 |
| 4,817,183 A | 3/1989 | Sparrow | 382/4 |
| 4,827,527 A | 5/1989 | Morita et al. | 382/4 |
| 4,837,843 A | 6/1989 | Owechko | 382/31 |
| 4,876,726 A | 10/1989 | Capello et al. | 382/4 |
| 4,891,503 A | 1/1990 | Jewell | 235/380 |
| 4,896,363 A | 1/1990 | Taylor et al. | 382/5 |
| 4,907,156 A | 3/1990 | Doi et al. | 364/413.13 |
| 4,933,976 A | 6/1990 | Fishbine et al. | 382/4 |
| 4,944,021 A | 7/1990 | Hoshino et al. | 382/5 |
| 4,947,442 A | 8/1990 | Tanaka et al. | 382/5 |
| 4,947,443 A | 8/1990 | Costello | 382/5 |
| 4,956,870 A | 9/1990 | Hara | 382/30 |
| 4,993,068 A | 2/1991 | Piosenka et al. | 380/23 |
| 4,995,086 A | 2/1991 | Lilley et al. | 382/4 |
| 5,040,223 A | 8/1991 | Kamiya et al. | 382/4 |
| 5,040,224 A | 8/1991 | Hara | 382/4 |
| 5,050,220 A | 9/1991 | Marsh et al. | 382/4 |
| 5,050,222 A | 9/1991 | Lee | 382/21 |
| 5,053,608 A | 10/1991 | Senanayake | 235/380 |
| 5,054,090 A | 10/1991 | Knight et al. | 382/4 |
| 5,067,162 A | 11/1991 | Driscoll, Jr. et al. | 382/5 |
| 5,095,194 A | 3/1992 | Barbanell | 235/379 |
| 5,101,436 A | 3/1992 | DeAguiar et al. | 382/1 |
| 5,105,467 A | 4/1992 | Kim et al. | 382/4 |
| 5,109,428 A | 4/1992 | Igaki et al. | 382/5 |
| 5,144,680 A | 9/1992 | Kobayashi et al. | 382/4 |
| 5,151,945 A | 9/1992 | Lee et al. | 382/1 |
| 5,175,593 A | 12/1992 | Kumagai et al. | 356/71 |
| 5,187,747 A | 2/1993 | Capello et al. | 382/4 |
| 5,187,748 A | 2/1993 | Lee | 382/4 |
| 5,222,152 A | 6/1993 | Fishbine et al. | 382/2 |
| 5,222,153 A | 6/1993 | Beiswenger | 382/4 |
| 5,239,590 A | 8/1993 | Yamamoto | 382/4 |
| 5,402,324 A | 3/1995 | Yokoyama et al. | 362/19 |
| 5,416,573 A | 5/1995 | Sartor, Jr. | 356/71 |
| 5,448,649 A | 9/1995 | Chen et al. | 382/126 |
| 5,448,659 A | 9/1995 | Tsutsui et al. | 385/14 |
| 5,467,403 A | 11/1995 | Fishbine et al. | 382/116 |
| 5,493,621 A | 2/1996 | Matsumura | 382/125 |
| 5,509,083 A | 4/1996 | Abtahi et al. | 382/124 |
| 5,513,272 A | 4/1996 | Bogosian, Jr. | 382/116 |
| 5,522,623 A | 6/1996 | Soules et al. | 283/91 |
| 5,524,069 A | 6/1996 | Inoue | 382/270 |
| 5,524,161 A | 6/1996 | Omori et al. | 382/125 |
| 5,530,757 A | 6/1996 | Krawczyk | 380/23 |
| 5,541,994 A | 7/1996 | Tomko et al. | 380/30 |
| 5,563,345 A | 10/1996 | Kersten et al. | 73/602 |
| 5,572,597 A | 11/1996 | Chang et al. | 382/125 |
| 5,613,012 A | 3/1997 | Hoffman et al. | 382/115 |
| 5,619,586 A | 4/1997 | Sibbald | 382/127 |
| 5,623,552 A | 4/1997 | Lane | 382/124 |
| 5,625,448 A | 4/1997 | Ranalli et al. | 356/71 |
| 5,644,645 A | 7/1997 | Osuga | 382/124 |
| 5,668,603 A | 9/1997 | Copeland | 348/473 |
| 5,680,205 A | 10/1997 | Borza | 356/71 |
| 5,732,148 A * | 3/1998 | Keagy et al. | 382/124 |
| 5,796,858 A * | 8/1998 | Zhou et al. | 382/127 |
| 5,838,306 A * | 11/1998 | O'Connor et al. | 345/163 |
| 5,978,495 A | 11/1999 | Thomopoulos et al. | 382/124 |
| 5,991,431 A * | 11/1999 | Borza et al. | 382/127 |
| 6,021,212 A * | 2/2000 | Ho | 382/124 |
| 6,055,592 A * | 4/2000 | Smith | 345/163 |
| 6,067,079 A * | 5/2000 | Shieh | 345/173 |
| 6,148,094 A * | 11/2000 | Kinsela | 382/124 |
| 6,193,153 B1 * | 2/2001 | Lambert | 235/380 |
| 6,392,636 B1 * | 5/2002 | Ferrari et al. | 345/173 |

* cited by examiner

CONFIGURABLE MULTI-FUNCTION TOUCHPAD DEVICE

FIELD OF THE INVENTION

The present invention relates to fingerprint detection. More specifically, the present invention relates to fingerprint detection within the context of pointer touchpad devices.

BACKGROUND

Present pointer touchpad devices, which are basically stationary pointing devices, allow for the manipulation of a cursor icon or pointer on a graphic display (i.e., monitor) of a computer by a user. Current pointer touchpad devices operate in accordance with a coupling capacitance principle, wherein a conductive pointer, such as a finger, is used in conjunction with a two-layer grid of electrodes to provide for the movement of a cursor icon on the graphic display of a computer. The top layer of the two-layer grid contains a vertical series of electrode strips, while the bottom layer contains a series of horizontal electrode strips, the respective electrode strips are connected to an integrated circuit which measures the capacitance associated with each of the electrode strips.

The conductive pointer (i.e., finger), when applied to the pointer touchpad device, alters the capacitance between the respective strips, as the conductive pointer (i.e., finger) possesses very different properties than air. Accordingly, the position of the conductive pointer (i.e., finger) is determined based upon the difference in the capacitance between the respective electrode strips. The capacitance difference is translated from the two-layer grid of electrodes to a corresponding cursor icon contained on a graphic display of a computer which corresponds to or tracks the movement of the conductive pointer on the two-layer grid of electrodes.

Accordingly, the standard pointer touchpad device allows for the manipulation of a cursor icon or pointer on a graphic display, but does not typically provide any ancillary use or function besides cursor control. Presently, however, there is an effort to consolidate system periphery components into single multi-functional device in order to reduce the number of peripheral components and simplify the overall complexity of computer systems. Fingerprint recognition devices, however, have remained a separate and distinct component in most secure computer systems due in part to the fact that they are not easily consolidated or merged into existing system peripheral components.

Correspondingly, as more and more computer systems are incorporating the use of separate fingerprint recognition devices, in order to provide for system security, the need to consolidate the fingerprint recognition devices into existing peripheral components grows as the demand for simplified single multi-functional devices increases.

Fingerprint recognition devices provide for computer system security by verifying the identity of a user, via fingerprint authentication, before allowing the user access to the system or a secure application. Current fingerprint recognition devices are typically external to the to the computer system and are usually coupled to the computer system through a cable or other input device. The typical external fingerprint recognition device typically comprises an illumination source, a prism which contains a sensing surface for fingerprint placement, and a detection array. Accordingly, a fingerprint image is authenticated by the fingerprint recognition device by obtaining a reflected fingerprint image and comparing the reflected image to a database containing fingerprint images or data associated with authorized users.

Fingerprint authentication is typically used to selectively restrict access or entry to secure applications or to a secure computer system by restricting access only to authorized personnel. For instance, if a user attempts to gain access to a secure computer application, the computer system would prompt the user to place a select finger onto the external fingerprint recognition device for fingerprint authentication. Next, a fingerprint authentication takes place verifying whether or not the user is authorized to access the selected secure computer application. Accordingly, the fingerprint authentication process grants access or entry only to authorized users, while denying unauthorized access to other users who are not authorized for entry or use of the secure system.

Currently, secure computer systems, which require fingerprint authentication, utilize a separate pointer touchpad device for cursor control and a separate fingerprint recognition device for fingerprint authentication. Correspondingly, the use of two separate peripheral devices for two different functions (i.e., cursor control and fingerprint authentication) results in increased cost and complexity of operating a secure computer system. The cost is mainly attributed to the required support structure and circuitry necessary for operating two separate devices (pointer touchpad device and fingerprint recognition device) in a secure computer system. For instance, the pointer touchpad device requires a two-layer grid of electrodes, cursor control interface, and supporting circuitry in order to provide for the movement of a cursor icon on a graphic display of a computer. Likewise, the fingerprint recognition requires an illumination source, a prism, and a detection array, comparison database, and supporting circuitry in order to provide for fingerprint authentication.

With the ever increasing goal of reducing the size, number, and complexity of existing and peripheral components into a single multi-functional low cost component, the use of two separate components (pointer touchpad device and fingerprint recognition device) is counterproductive, as the use of two separate components translates to an increase in cost and complexity of secure computer systems which require the use fingerprint authentication.

It is therefore desirable to provide a multi-functional touchpad device which is capable of performing the individual tasks of manipulating a cursor icon on a graphic display of a computer and performing fingerprint authentication, within a singular multi-functional device.

SUMMARY OF THE INVENTION

An embodiment of the present invention provides a touchpad device comprised of a detection array having a detection surface, wherein the detection surface is configured to receive a fingerprint image. Additionally, a processing device is provided to receive the fingerprint image or image data from the detection array. The processing device configures the touchpad device to operate as a pointer control device or a fingerprint recognition device based upon parameters associated with the fingerprint image.

In one embodiment, the processing device uses an area parameter associated with the fingerprint image when configuring the touchpad device to operate as a pointer control device or a fingerprint recognition device.

In another embodiment, the processing device uses a pattern parameter associated with the fingerprint image when configuring the touchpad device to operate as a pointer control device or a fingerprint recognition device.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The present invention is directed to a configurable multi-functional touchpad device which is capable of operating as a pointer control device or a fingerprint recognition device based upon parameters associated with a fingerprint image.

Figure 1:
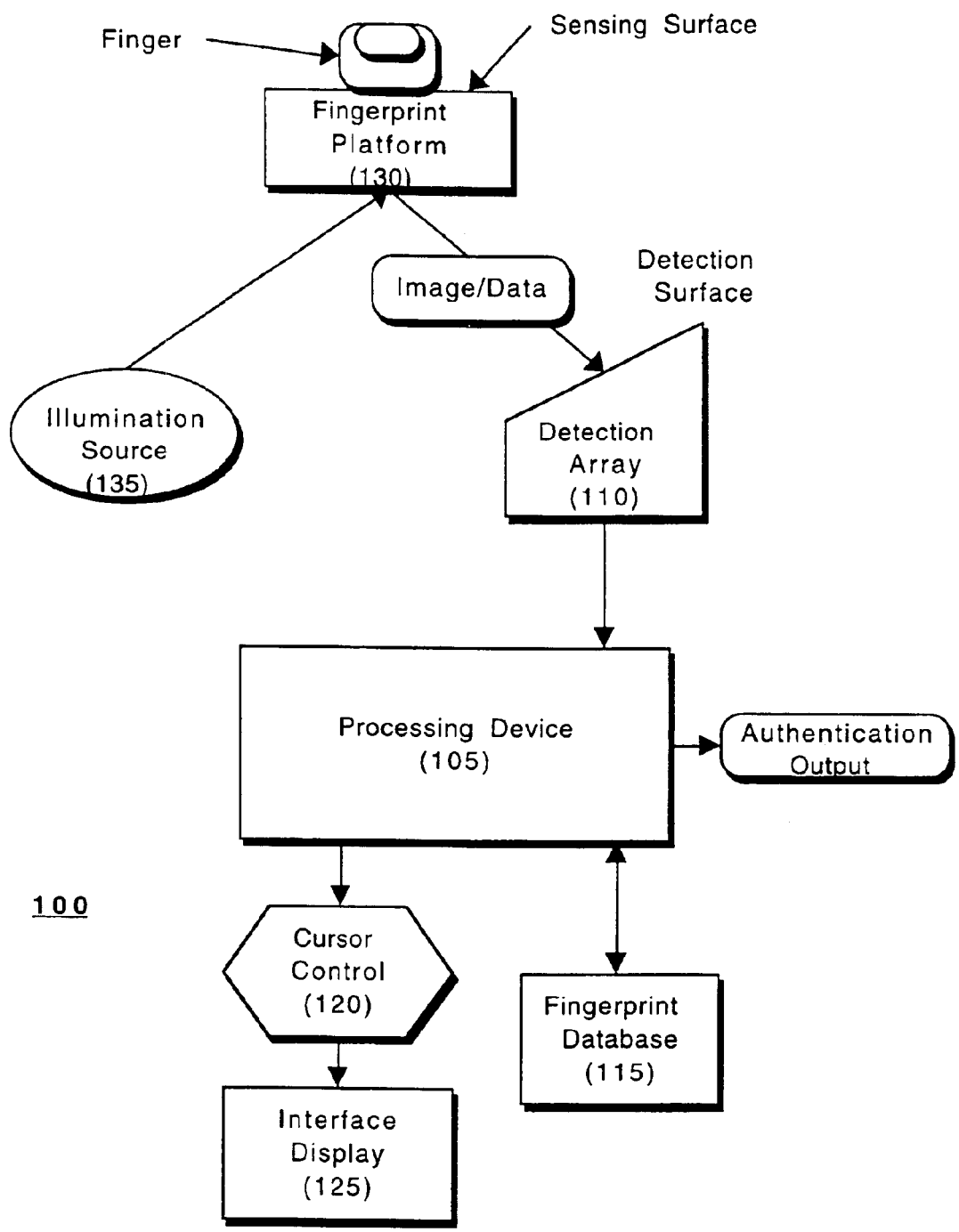
FIG. 1 illustrates a block diagram representation of an embodiment of a configurable multi-function touchpad device capable of implementing the teachings of the present invention.

FIG. 1 is a block diagram representation of an embodiment of a configurable multi-function touchpad device capable of implementing the teachings of the present invention. FIG. 1 illustrates a multi-function touchpad device 100 comprising a processing device 105 which is coupled to a detection array 110. The detection array 110 is configured to supply fingerprint images or fingerprint image data, associated with a proffered fingerprint image, to the processing device 105. In addition, a fingerprint database 115, containing a series of stored fingerprint images/data associated with select authorized personnel, is coupled to the processing device 105. The processing device 105 uses the series of stored fingerprint images or data for performing fingerprint image authentication by comparing the fingerprint images or fingerprint image data received from the detection array 110 to the fingerprint images/data stored in the fingerprint database 115.

Additionally, a cursor control interface 120 is coupled to the processing device 105, as illustrated in FIG. 1, the cursor control interface 120 is used by the processing device 105 for manipulating a cursor icon or pointer on an interface display 125, such as a computer display monitor. Although the fingerprint database 115 and cursor control interface 120 are illustrated, for purposes of illustration and clarity, as separate components which are coupled to the processing device 105, it is understood that these components can be contained within different control and memory devices maintained within the processing device 105. The processing device 105 is configured to operate the multi-functional touchpad device 100 as a pointer control device or a fingerprint recognition device based upon select parameters associated with a reflected (proffered) fingerprint image.

Further, a fingerprint platform 130 and associated illumination device 135 are provided, as illustrated in FIG. 1, in order to provide a reflected fingerprint image or images, corresponding to the placement of the finger upon the fingerprint sensing platform 130, to the detection surface of the detection array 110.

Figure 1A:
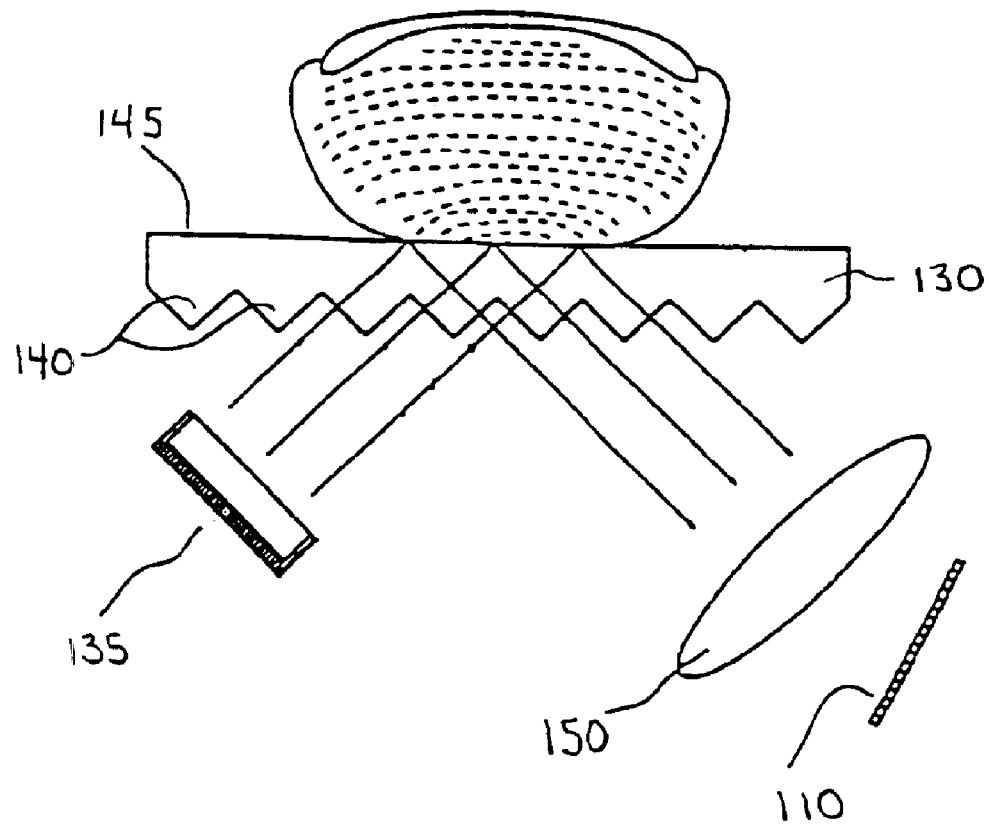
FIG. 1A illustrates an embodiment of a fingerprint platform for use with configurable multi-function touchpad device.

In one embodiment of the fingerprint platform 130, as illustrated in FIG. 1A, the fingerprint platform 130 comprises a sheet prism, which possesses a slim profile as compared to a standard full size prism which typically possesses a large triangular profile. The sheet prism is mainly used in applications which generally require a slim profile fingerprint platform, such as in a laptop computer touchpad. The fingerprint platform 130, illustrated in FIG. 1A, comprises a series of prismlets 140 which are positioned opposite the sensing surface 145 of the sheet prism. Accordingly, each prismlet 140 has a corresponding entrance and exit surface, each prismlet 140 being adjacent to another prismlet 140 within the sheet prism. Correspondingly, when a fingerprint image (finger) is placed on the sensing surface 145, a portion of the illumination radiation from the illumination source 135 enters the entrance surface of the prismlets 140.

Where ridges on the finger are in contact with the sensing surface 145, the radiant energy will be transmitted into or absorbed by the finger. Alternately, the grooves of the fingerprint image (fingerprint), which do not make contact with the sensing surface 140, reflect the radiant energy from the sensing surface 145 toward the respective exit surface associated with each prismlet 140. The reflected radiant energy exits via the respective exit surfaces of the prismlets 140 and is directed to the detection surface of a detection array 110, typically through a lens 150, wherein a reflected image of the fingerprint image is formed on the detection surface of the detection array 110.

Correspondingly, in an alternate embodiment of the fingerprint platform 130, a standard full size prism could be used which would provide similar operational functionality, as compared with the sheet prism, however, without possessing the slim profile.

Referring back to FIG. 1, the detection array 110 or charge-coupled device (CCD chip) utilizes a semiconductor technology for producing light-sensitive devices, such as cameras (i.e., video and standard) and image scanners, on the detection surface of the detection array 110. Each detection array 110, or CCD chip, is generally comprised of an array of light-sensitive photocells, wherein each photocell is sensitized by giving the photocell an electrical charge prior to exposure. The use of the detection array 110 in conjunction with the processing device 105 will be discussed, in further detail below, within the operational context of the multi-function touchpad device 100.

In operation, fingerprint images are reflected onto the detection surface of the detection array 110 via a fingerprint platform 130 which is illuminated by an illumination source 135. The illumination source 135 is used in conjunction with the fingerprint platform 130 and detection array 110 for generating reflected fingerprint images which are supplied to the detection surface of the detection array 110. Correspondingly, the detection array 110 is configured to supply fingerprint images or image data to the processing device 105, wherein the processing device 105 configures the multi-functional touchpad device 100 to operate as a pointer control device or a fingerprint recognition device based upon select parameters associated with the fingerprint image.

FIGS. 2A, 2B, 3A and 3B illustrate embodiments of the detection surface of the detection array 110. The detection surface of the detection array 110 is comprised of a series of light-sensitive photocells configured to generate an image or image data in response to the reflected illumination of an fingerprint image being directed onto the array of photocells. The photocells contained on the detection surface of the detection array 110 may be arranged into any type of configuration, such as an oval configuration directly corresponding to a full size fingerprint image, or a grid configuration, or any other configuration which is desired. Further, it is understood that any desired number of photocells could be used in composing the detection surface of a detection array.

Figure 2A:
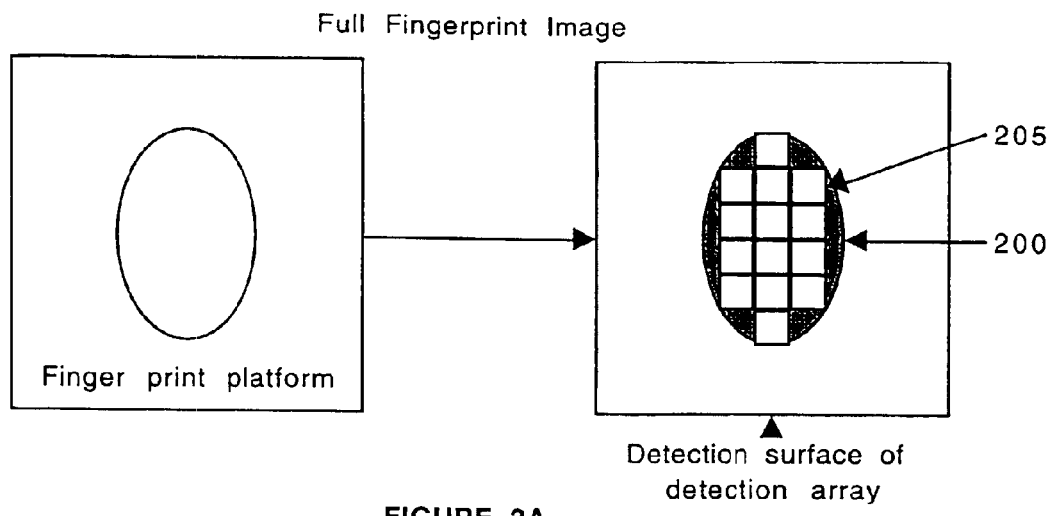
FIGS. 2A and 2B illustrate embodiments of a detection surface of a detection array being operated in an area recognition mode.

FIG. 2A illustrates the detection surface of the detection array 110 when a full fingerprint is placed onto the fingerprint platform 130 and is reflected onto the detection surface of the detection array 110. Accordingly, the reflected full fingerprint image 200, reflected onto the detection surface of the detection array surface 110, occupies a specific area on the detection surface of the detection array 110. Correspondingly, the reflected full fingerprint image 200 energizes a particular number of photocells 205 of the detection surface of the detection array 110 corresponding to the specific area occupied by the reflected full fingerprint image 200 on detection surface. In FIG. 2A, the reflected full fingerprint image 200 may for instance occupy an area corresponding to, either wholly or partially, 40%–70% median area of the detection surface of the detection array 110. Accordingly, any image which occupies the 40%–70% median area of the detection surface of the detection array 110 would be classified as a full fingerprint image 200. It is understood that the above illustrated percentage limits (40%–70%) are for illustration purposes. Further, it is understood that the median area corresponding to a full fingerprint image 200 may be selected and set to any desired value which allows a fingerprint image to be classified as a full fingerprint image 200 by the processing device 105.

Figure 2B:
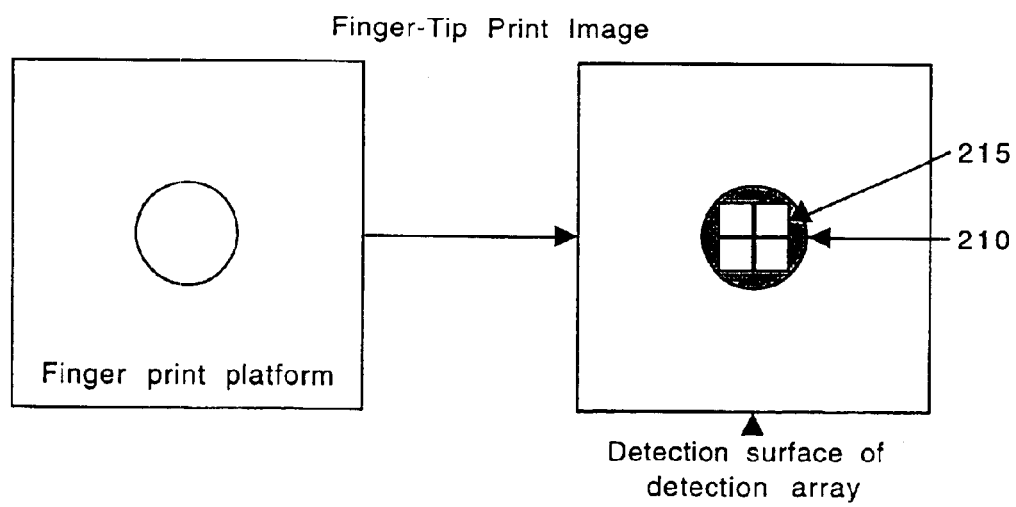

FIG. 2B illustrates the detection surface of the detection array 110 when a finger-tip print is placed onto the fingerprint platform 130 and is reflected onto the detection surface of the detection array 110. Accordingly, the reflected finger-tip print image 210, reflected onto the detection surface of the detection array surface 110, occupies a specific area of the detection surface of the detection array 110. Correspondingly, the reflected finger-tip print image 210 thereby energizes a particular number of photocells 215 of the detection surface of the detection array 110 corresponding to the specific area occupied by the reflected finger-tip print image 210 on detection surface on the detection surface of the detection array 110. In FIG. 2B, the reflected finger-tip print image 210 may for instance occupy an area corresponding to, either wholly or partially, 15%–25% median area of the detection surface of the detection array 110. Accordingly, any image which occupies the 15%–25% median area of the detection surface of the detection array 110 would be classified as a finger-tip print image 210. It is understood that the above illustrated percentage limits (15%–25%) are for illustration purposes. Further, it is understood that the median area corresponding to a finger-tip print image 210 may be selected and set to any desired value which allows the fingerprint image to be classified as a finger-tip print image 210 by the processing device 105.

Figure 3A:
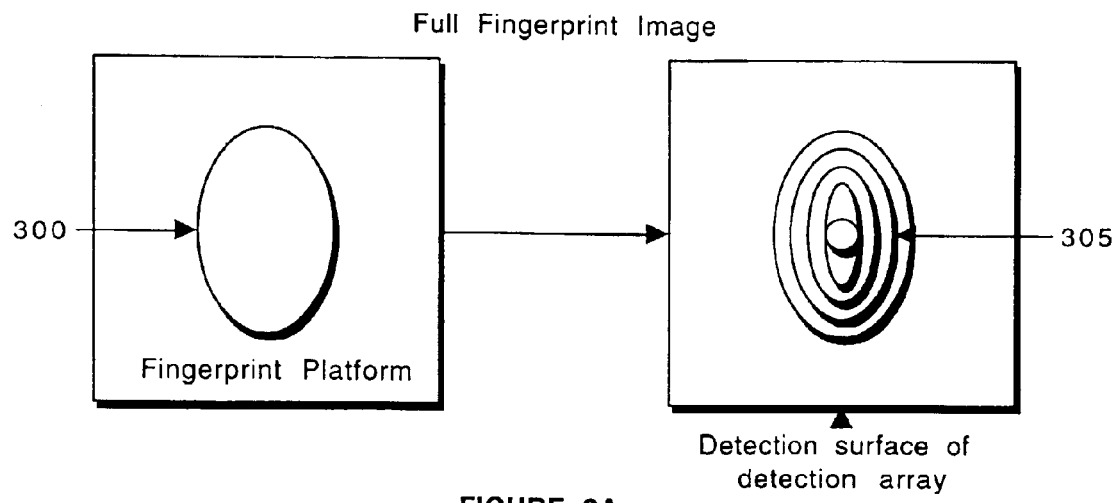
FIGS. 3A and 3B illustrate embodiments of a detection surface of a detection array being operated in an pattern recognition mode.

FIG. 3A illustrates the detection surface of the detection array 110 when a full fingerprint image 300 is placed onto the fingerprint platform 130 and a full fingerprint pattern 305 corresponding to the full fingerprint image 300 is reflected onto the detection surface of the detection array 110. Generally, a full fingerprint image 300 possesses a substantially concentric fingerprint pattern 305 which identifies the fingerprint pattern (concentric pattern) as corresponding to a full fingerprint image 300.

Accordingly, the reflected full fingerprint pattern 305 (concentric pattern), reflected onto the detection surface of the detection array 110, is analyzed by the processing device 105. The processing device 105 is configured to determine the type of pattern associated with the reflected print image by analyzing the pattern structure associated with the proffered fingerprint image. The processing device 105 can use various methods of determining the pattern structure associated with a proffered fingerprint image in order to determine if a particular fingerprint image possesses a concentric pattern which corresponds to a full fingerprint image.

For instance, the processing device 105 could compare the proffered fingerprint pattern (concentric) to an empirically determined average concentric fingerprint pattern, or pattern map the fingerprint pattern to determine if the fingerprint pattern associated with the fingerprint image conforms to a concentric pattern, or any other method or process for determining that the fingerprint image possesses a concentric pattern.

Figure 3B:
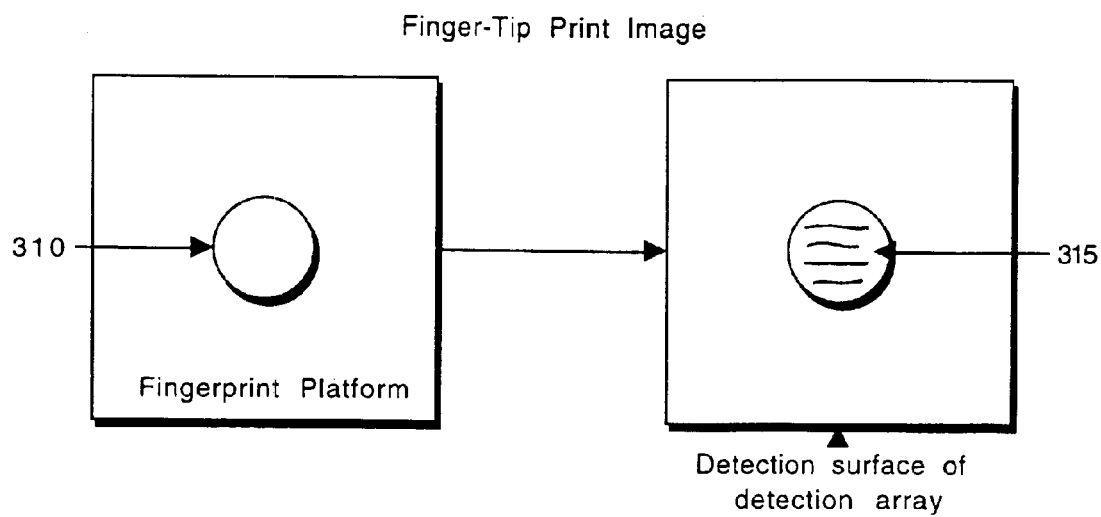

FIG. 3B illustrates the detection surface of the detection array 110 when a finger-tip print image 310 is placed onto the fingerprint platform 130 and a finger-tip pattern 315 corresponding to the finger-tip image 310 is reflected onto the detection surface of the detection array 110. Generally, a finger-tip print image 310 possesses a substantially parallel line fingerprint pattern 315 which identifies the fingerprint pattern (substantially parallel line pattern) as corresponding to a finger-tip print image 310.

Accordingly, the reflected finger-tip print pattern 315 (substantially parallel line pattern), reflected onto the detection surface of the detection array 110, is analyzed by the processing device 105. The processing device 105 is configured to determine the type of pattern associated with the reflected print image by analyzing the pattern structure associated with the proffered fingerprint image. The processing device 105 can use various methods of determining the pattern structure associated with a proffered fingerprint image in order to determine if a particular fingerprint image possesses a substantially parallel line fingerprint pattern which corresponds to a finger-tip print image.

For instance, the processing device 105 could compare the proffered fingerprint pattern (parallel line) to an empirically determined average parallel line fingerprint pattern, or pattern map the proffered fingerprint pattern to determine that the proffered fingerprint pattern conforms to a parallel line pattern, or any other method or process for determining that the fingerprint image possesses a parallel line pattern.

Referring back to FIG. 1, the processing device 105 receives images or image data corresponding to either a full fingerprint image (FIGS. 2A and 3A) or a finger-tip print image (FIGS. 2B and 3B) from the detection array 110. As mentioned above, the multi-function touchpad device 100 is configured to operate as a pointer control device or a fingerprint recognition device based upon select parameters associated with a fingerprint image which are reflected in the images or image data supplied to the processing device 105. Accordingly, the processing device 105 analyzes the images or image data, received from the detection array 110, to determine the operational mode of the multi-function touchpad device 100.

Additionally, the operational mode of the multi-function touchpad device 100 can be configured in accordance with the preferences of a particular user. As such, the user may disable, enable, or customize, any operational mode feature of the touchpad device 100, after completing the fingerprint recognition or authentication process. Thus, the user may configure the operation of the multi-function touchpad device 100 to operate only as a pointer control device during a particular operating session through the use of an operational interface or selection menu. For example, after a particular user has finished the fingerprint recognition process, the user may configure the operation of the multi-unction touchpad device 100 to operate only as a pointer control device for the remainder or duration of an operating session, thereby temporarily disabling the multi-function touchpad device 100 from operating as a fingerprint recognition device during the particular operating session. Likewise, any preferred operational mode feature of the touchpad device 100 can be retained and applied to all future operating sessions.

Further, the user may configure the operation of the multi-function touchpad device 100 to operate as a fingerprint recognition device at select time intervals. Configuring the multi-function touchpad device 100 to operate as a fingerprint recognition device at select time intervals allows for the continuous secured operation of a particular application or terminal during an operating session. For instance, by operating the multi-function touchpad device 100 as a recognition device at select time intervals, the user is continuously authenticated, at the select time intervals, as being authorized to conduct secured transactions during a particular operating session. As a result, unauthorized users are prevented from gaining any appreciable access to a secured application or terminal during an authorized users temporary absence or non-use of an application or terminal during a particular operating session.

In one embodiment, the processing device 105 is configured to examine an area parameter associated with a proffered fingerprint image, which is represented in the images or image data received from the detection array 110. Accordingly, the processing device 105 maintains information corresponding to different area median ranges associated with different types of fingerprint images. Each area median range represents a an average physical area of the detection surface of the detection array 110 associated with different types of images or image data corresponding to different fingerprint images. As such, the area median range likewise corresponds with a select number or range of photocells which correspond to the physical area associated with the different fingerprint images (i.e., full fingerprint image or finger-tip print image).

For instance, a first median area range would correspond to the physical area associated with a full fingerprint image. Accordingly, the first median range would correspond to a number or range of photocells which would be activated upon the reception of a reflected full fingerprint image on the detection surface of the detection array 110 (FIG. 2A). Likewise, a second median area range would correspond to the physical area associated with a finger-tip print image. Accordingly, the second median range would correspond to a number or range of photocells which would be activated upon the reception of a reflected finger-tip print image on the detection surface of the detection array 110 (FIG. 2B).

In another embodiment, the processing device 105 is configured to examine a pattern parameter associated with a proffered fingerprint image, which is represented in the images or image data received from the detection array 110. Accordingly, the processing device 105 maintains information corresponding to different fingerprint patterns associated with different types of fingerprint images. Each fingerprint pattern represents a physical pattern associated with a different type of fingerprint image (i.e., full fingerprint image or finger-tip print image).

For instance, a fingerprint pattern corresponding to the full fingerprint image possesses a concentric fingerprint pattern which identifies the fingerprint pattern (concentric pattern) as corresponding to a full fingerprint image (FIG. 3A). Likewise, a fingerprint pattern corresponding to the finger-tip pattern possesses a substantially parallel line fingerprint pattern which identifies the fingerprint pattern (substantially parallel line pattern) as corresponding to a finger-tip print image (FIG. 3B).

Accordingly, after the processing device 105 receives the images or image data from the detection array 110, the processing device 105 examines the associated parameters (either area or pattern parameters) contained in the images or image data in order to determine the corresponding operational mode of the multi-function touchpad device 100. Upon determining the type of fingerprint image, by analyzing the associated parameters (either area or pattern parameters), the processing device 105 configures the multi-function touchpad device 100 to operate as a pointer control device or a fingerprint recognition device based upon the particular parameters contained in the image data. It is understood that the processing device 105 could be configured to analyze both the area parameter and pattern parameter, in combination, associated with a particular fingerprint image in order to determine the corresponding operational mode of the multi-function touchpad device 100.

In operation, if the processing device 105 determines that the image data received from the detection array 110 corresponds to a reflected full fingerprint image (area parameter corresponding to a full fingerprint image or a concentric fingerprint pattern corresponding to a full fingerprint image), then the processing device 105 configures the multi-function touchpad device 100 to operate as a fingerprint recognition device.

Alternately, if the processing device 105 determines that the image data received from the detection array corresponds to a reflected finger-tip print image (area parameter corresponding to a finger-tip print image or a substantially parallel line pattern corresponding to a finger-tip print image), then the processing device 105 configures the multi-function touchpad device 100 to operate as a pointer control device.

Accordingly, if the processing device 105 determines that the image data corresponds to a full fingerprint image (area parameter corresponding to a full fingerprint image or a concentric fingerprint pattern corresponding to a full fingerprint image), then the processing device 105 performs a fingerprint authentication process, wherein the full fingerprint image or image data is compared against a series of authorized fingerprint images or data contained in the fingerprint database 115. The fingerprint authentication process is carried out by the processing device 105, wherein the proffered full fingerprint image or image data is compared to a series of authorized fingerprint images contained in the fingerprint database 115. The processing device 105 can be configured to use a variety of different authentication protocols to accomplish the authentication process, such as, but not limited to fingerprint map pattern comparisons, digitized fingerprint analysis, or any other fingerprint authentication process.

Next, the processing device 105 determines whether or not the proffered fingerprint matches any of the authorized fingerprint images contained in the fingerprint database 115. If the proffered fingerprint matches any of the authorized fingerprint images contained in the fingerprint database 115, the processing device 105 generates an authentication output which allows the user to access a secure application or conduct any secure transaction requiring fingerprint authentication. It is understood that the processing device 105 can be configured to limit access to a variety of different secure applications, only to those users who have authorized fingerprint images associated with a select secure application.

Conversely, if the processing device 105 determines that the image data corresponds to a finger-tip print image (area parameter corresponding to a finger-tip print image or a substantially parallel line pattern corresponding to a finger-tip print image), then the processing device 105 perform a cursor control function. Upon determination that the image or image data received by the processing device 105 corresponds to a finger-tip print image, the processing device 105 tracks the location of the reflected finger-tip print image on the detection surface of the detection array 110.

Accordingly, the detection surface of the detection array 110 is mapped against the interface display 125 (i.e., computer display monitor), so that the position or location of the finger-tip print image on the detection surface of the detection array 110 corresponds to a mapped location on the interface display 125. Thus, the processing device 105 is configured to determine the position of the finger-tip of the detection surface of the detection array 110 by determining which photocells on the detection surface of the detection array 110 are energized by the reflected finger-tip image. Correspondingly, the processing device 105 tracks the movement of the reflected finger-tip image along the detection surface of the detection array 110 and converts the position, via a cursor control device 120, into a corresponding cursor icon or pointer display on the interface display 125.

In an alternate embodiment, the detection surface of the detection array 110 is configured to contain light-sensitive real-time video camera devices, which track the position of the reflected fingerprint image on the detection surface of the detection array 110. The detection array 110 then supplies tracking data, corresponding to the location or position of the reflected fingerprint image on the detection surface of the detection array 110, to the processing device 105. Accordingly, the processing device 105 is configured to determine and monitor the location or position of the reflected finger-tip print image on the detection surface of the detection array 110 based upon the tracking data. Further, the processing device 105 receives the tracking data from the light-sensitive camera devices and converts the tracking data, via a cursor control device 120, into a corresponding cursor icon or pointer display on the interface display 125.

Figure 4:
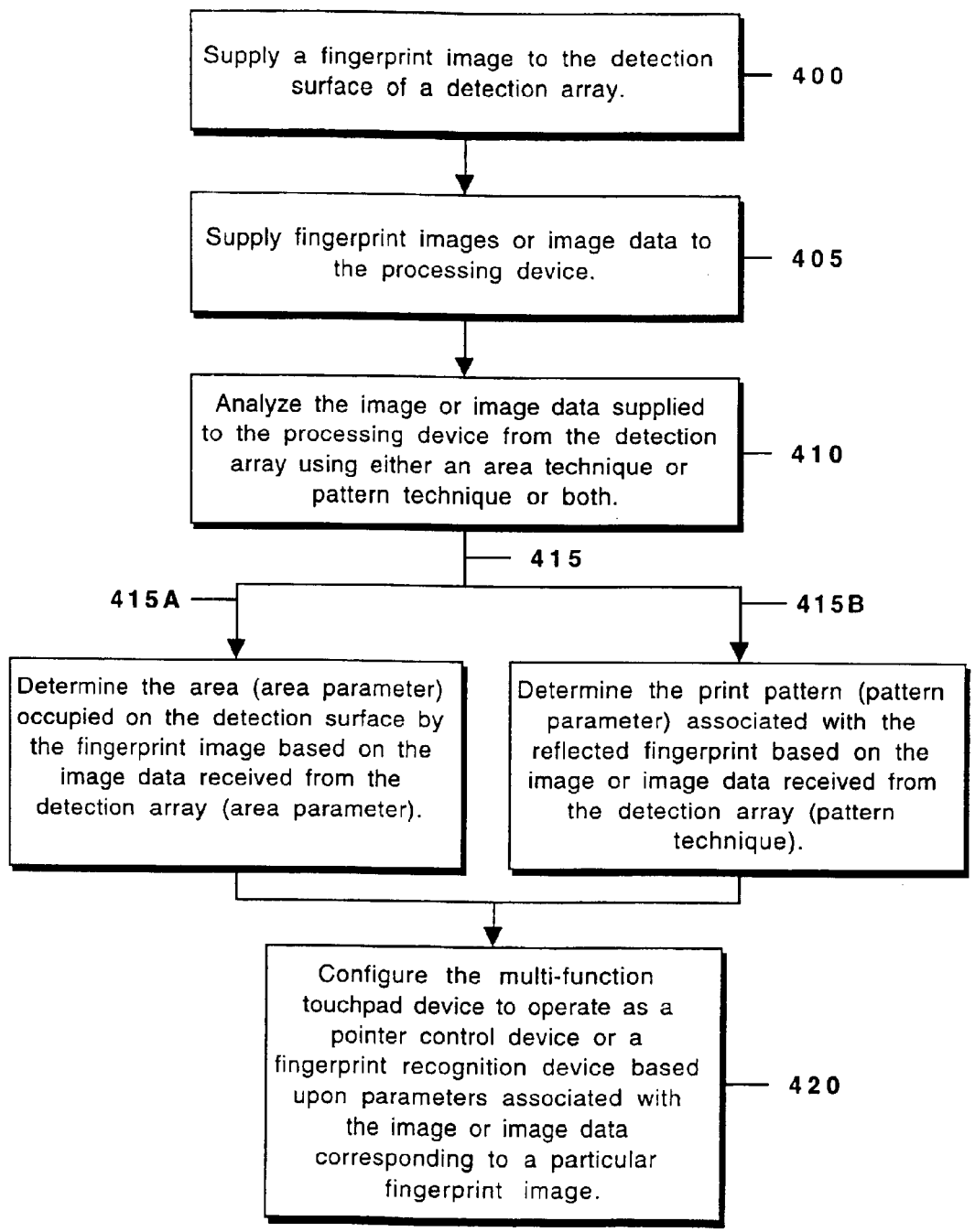
FIG. 4 is an embodiment of a flow chart illustrating the operational characteristics of the multi-function touchpad device.
Figure 4:
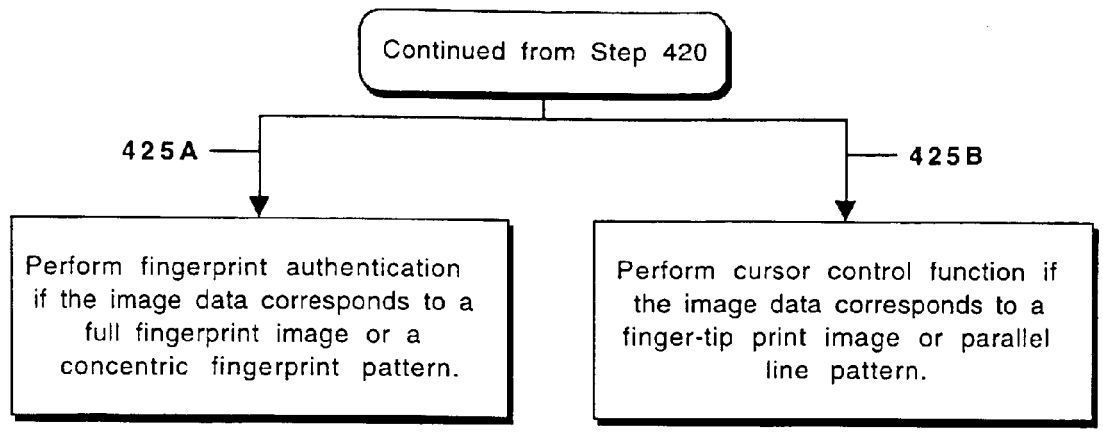

FIG. 4 illustrates an embodiment of a flow chart illustrating the operational characteristics of the multi-function touchpad device 100. Initially, at Step 400, a finger is placed upon the fingerprint platform 130 wherein a corresponding fingerprint image, based upon the orientation of the finger (full fingerprint or finger-tip) on the sensing surface of the platform, is supplied to the detection surface of the detection array 110.

At Step 405, the processing device 105 receives fingerprint image data from the detection array 110 corresponding to the orientation of the finger (full fingerprint or finger-tip) on the sensing surface of the fingerprint platform 130. Accordingly, the orientation of the finger on the sensing surface of the fingerprint platform 130 determines the type of fingerprint image which is supplied to the detection surface of the detection array 110. Correspondingly, the image or image data which is supplied to the processing device 105 corresponds to the type of fingerprint image which is supplied to the detection surface of the detection array 110.

At Step 410, the processing device analyzes the image or image data supplied to the processing device 105 from the detection array 110. The processing device 105 is configured to analyze the image or image data in two different manners, an area technique or pattern technique, or by using a combination of the area technique and pattern technique.

Accordingly, as illustrated at Step 415A, if the processing device 105 is using the area technique, the processing device 105 determines the area (area parameter) occupied on the detection surface of the detection array 110 by the fingerprint image, based on the image data received from the detection array 110. The area occupied by the fingerprint image corresponds to the orientation of the finger (full fingerprint or finger-tip) on the sensing surface of the fingerprint platform 130. The reflected fingerprint image energizes a particular number of photocells contained on the detection surface of the detection array 110 which corresponds to the physical area occupied by the reflected fingerprint image on detection surface of the detection array 110. Therefore, the number of energized photocells corresponds to the area of the reflected fingerprint image on the detection surface of the detection array 110. The image data which is supplied to the processing device 105 represents the area of the reflected fingerprint image based upon the number of photocells which are energized.

When a full fingerprint image is reflected onto the detection surface of the detection array 110, the image data represents the area occupied on the detection surface of the detection array 110 in the number or percentage of photocells which are energized by the reflected full fingerprint image. The full fingerprint image energizes a greater number or percentage of photocells, as compared to a finger-tip print image, on the detection surface of the detection array 110 as the full fingerprint image occupies a greater area than a finger-tip print image.

Similarly, when a finger-tip print image is reflected onto the detection surface of the detection array 110, the image data represents the physical area occupied on the detection surface of the detection array 110 in the number or percentage of photocells which are energized by the reflected finger-tip print image. The finger-tip print image energizes a lesser number or percentage of photocells, as compared to a full fingerprint image, on the detection surface of the detection array 110 as the finger-tip print image occupies a smaller area than a fingerprint image.

Alternately, as illustrated at Step 415B, if the processing device 105 is using the pattern technique, the processing device 105 determines the print pattern (pattern parameter) associated with the reflected fingerprint based on the image or image data received from the detection array 110. The particular print pattern associated with the fingerprint image corresponds to the orientation of the finger (full fingerprint or finger-tip) on the sensing surface of the fingerprint platform 130. The reflected fingerprint image likewise possesses a particular pattern based upon the orientation of the finger (full fingerprint or finger-tip) on the sensing surface of the fingerprint platform 130.

For instance, a full fingerprint image generally possess a concentric fingerprint pattern which identifies that the fingerprint image corresponds to a full fingerprint image. Whereas, the finger-tip print pattern generally possesses a substantially parallel line pattern which identifies that the fingerprint image corresponds to a finger-tip print.

At Step 420, the processing device 105, upon receiving an image or image data from the detection array 110, configures the multi-function touchpad device 100 to operate as a pointer control device or a fingerprint recognition device based upon parameters associated with the image or image data corresponding to a particular fingerprint image.

If the processing device 105 determines that the image data received from the detection array 110 corresponds to a reflected full fingerprint image (area parameter) or a concentric fingerprint pattern (pattern parameter), then the processing device 105 configures the multi-function touchpad device 100 to operate as a fingerprint recognition device.

Alternately, if the processing device 105 determines that the image data received from the detection array 110 corresponds to a reflected finger-tip print image (area parameter) or a parallel line pattern (pattern parameter), then the processing device 105 configures the multi-function touchpad device 100 to operate as a pointer control device.

It is further understood that the pattern and area parameters could be combined, wherein the processing device 105 could detect both a pattern and area parameter associated with an image, thereby identifying the image as either a full fingerprint image or finger-tip print image based upon both the pattern and area parameters, in order to configure the operation of the multi-function touchpad device 100.

Accordingly, at Step 425A, if the processing device 105 determines that the image data corresponds to a full fingerprint image or a concentric fingerprint pattern, then the processing device 105 performs a fingerprint authentication process, wherein the fingerprint image or representative image data is compared against a series of authorized fingerprint images or data contained in the fingerprint database 115. The fingerprint authentication process is carried out by the processing device 105, wherein the proffered fingerprint image is compared to a series of authorized fingerprint images or data contained in the fingerprint database 115. The processing device 105 can be configured to use a variety of different authentication protocols to accomplish the authentication process, such as, but not limited to fingerprint map pattern comparisons, digitized fingerprint analysis, or any other fingerprint authentication process.

Correspondingly, the processing device 105 determines whether or not the proffered fingerprint matches any of the authorized fingerprint images or data contained in the fingerprint database 115. If the proffered fingerprint matches any of the authorized fingerprint images or data contained in the fingerprint database 115, the processing device 105 allows the user to access a secure application or conduct any secure transaction which requires fingerprint authentication. It is understood that the processing device 105 can be configured to limit access to a variety of different secure applications, only to those users who have authorized fingerprint images associated with a select secure application.

Conversely, at Step 425B, if the processing device 105 determines that the image data corresponds to a finger-tip print image or parallel line pattern, then the processing device 105 performs a cursor control function. Upon determination that the image data received by the processing device 105 corresponds to a finger-tip print image or parallel line pattern, the processing device 105 tracks the location of the reflected finger-tip print image on the detection surface of the detection array 110. The detection surface of the detection array 110 is mapped against the interface display 125 (i.e., computer display monitor), so that the position or location of the of the finger-tip print image on the detection surface of the detection array 110 corresponds to a mapped location on the interface display 125. Accordingly, the processing device 105 is configured to determine the position of the finger-tip of the detection surface of the array by determining which photocells on the detection surface of the detection array 110 are energized. Correspondingly, the processing device 105 tracks the movement of the reflected finger-tip image along the detection surface of the detection array 110 and converts the position, via a cursor control device 120, into a corresponding cursor icon or pointer display on the interface display 125.

In an alternate embodiment, the detection surface of the detection array 110 is configured to contain light-sensitive real-time video camera devices, which track the position of the reflected fingerprint image on the detection surface of the detection array 110. The detection array 110 then supplies tracking data, corresponding to the location or position of the reflected fingerprint image on the detection surface, to the processing device 105. Accordingly, the processing device 105 is configured to determine and monitor the location or position of the reflected finger-tip print image on the detection surface of the detection array 110 based upon the tracking data. Further, the processing device 105 receives the tracking data from the light-sensitive camera devices and converts the tracking data, via a cursor control device 120, into a corresponding cursor icon or pointer display on the interface display 125.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A touch pad device configurable to be a pointer control device and a fingerprint recognition device, the touchpad device comprising:
   a detection array having a detection surface, wherein the detection surface is configured to receive a fingerprint image;
   a processing device to receive image data from the detection array, the processing device further to configure the touchpad device to operate as the pointer control device to move a cursor or the fingerprint recognition device based upon parameters associated with the image data.

2. The touchpad device of claim 1, further comprising a fingerprint platform, wherein the fingerprint platform is configured to supply a fingerprint image to the detection surface of the detection array.

3. The touchpad device of claim 1, wherein the fingerprint platform comprises a sheet prism.

4. The touchpad device of claim 3, wherein the sheet prism is configured to focus the fingerprint image onto the detection surface of the detection array.

5. The apparatus of claim 1, wherein the touchpad device is configured to operate as a pointer control device or a fingerprint recognition device based upon an area parameter associated with the fingerprint image.

6. The apparatus of claim 5, wherein the touchpad device is configured to operate as a fingerprint recognition device when the area parameter associated with the fingerprint image corresponds to a first area median range.

7. The apparatus of claim 5, wherein the touchpad device is configured to operate as a pointer control device when the area parameter associated with the fingerprint image corresponds to a second area median range.

8. The apparatus of claim 1, wherein the touchpad device is configured to operate as a pointer control device or a fingerprint recognition device based upon a pattern parameter associated with the fingerprint images.

9. The apparatus of claim 8, wherein the touchpad device is configured to operate as a fingerprint recognition device when the pattern parameter associated with the fingerprint image conforms to a first pattern.

10. The apparatus of claim 9, wherein the first pattern corresponds to a full fingerprint pattern.

11. The apparatus of claim 8, wherein the touchpad device is configured to operate as a pointer control device when the pattern parameter associated with the fingerprint image conforms to a second pattern.

12. The apparatus of claim 11, wherein the second pattern corresponds to a finger-tip print pattern.

13. The apparatus of claim 1, wherein the processing device is configured to translate the position of the fingerprint image on the detection surface into a cursor position on an interface area of a display when the touchpad device operates as a pointer control device.

14. The apparatus of claim 1, wherein the touchpad device is configured to operate as a pointer control device or a fingerprint recognition device based upon both a pattern parameter and an area parameter associated with the fingerprint image.

15. A multi-function device configurable to be a pointer control device and a fingerprint recognition device, the multi-function device comprising:

means for supplying a fingerprint image to a detection surface of a detection array;

means for processing the fingerprint image supplied to the detection array, wherein the means for processing configures the multi-function device to operate as the pointer movement control device or the fingerprint recognition device based upon parameters associated with the fingerprint image.

16. The multi-function device of claim 15, wherein the pointer control device controls movement of a cursor on a display screen.

17. The multi-function device of claim 15, wherein the multi-function device is configured to operate as a pointer control device or a fingerprint recognition device based upon an area parameter associated with the fingerprint image.

18. The multi-function device of claim 17, wherein the multi-function device is configured to operate as a fingerprint recognition device when the area parameter associated with the fingerprint image corresponds to a first area median range.

19. The multi-function device of claim 17, wherein the multi-function device is configured to operate as a pointer control device when the area parameter associated with the fingerprint image corresponds to a second area median range.

20. The multi-function device of claim 15, wherein the multi-function device is configured to operate as a pointer control device or a fingerprint recognition device based upon a pattern parameter associated with the fingerprint images.

21. The multi-function device of claim 20, wherein the multi-function device is configured to operate as a pointer control device when the pattern parameter associated with the fingerprint image conforms to an average finger-tip pattern.

22. The multi-function device of claim 20, wherein the multi-function device is configured to operate as a fingerprint recognition device when the pattern parameter associated with the fingerprint image conforms to an average fingerprint pattern.

23. A method of analyzing a fingerprint image to configure the operation of a multi-function device, the multi-function device configurable to be a pointer movement control device and a fingerprint recognition device, the method comprising:

supplying a fingerprint image to a detection surface of a detection array;

analyzing select fingerprint parameters associated with the fingerprint image;

configuring the multi-function device to operate as the pointer movement control device or the fingerprint recognition device based upon the fingerprint parameters associated with the fingerprint image.

24. The method of claim 23, wherein the multi-function device is configured to operate as a pointer control device or a fingerprint recognition device based upon an area parameter associated with the fingerprint image.

25. The method of claim 24, wherein the multi-function device is configured to operate as a fingerprint recognition device when the area parameter associated with the fingerprint image corresponds to a full fingerprint image.

26. The method of claim 24, wherein the multi-function device is configured to operate as a pointer control device when the area parameter associated with the fingerprint image corresponds to a finger-tip print image.

27. The method of claim 23, wherein the multi-function device is configured to operate as a pointer control device or a fingerprint recognition device based upon an pattern parameter associated with the fingerprint images.

28. The method of claim 27, wherein the multi-function device is configured to operate as a fingerprint recognition device when the pattern parameter associated with the fingerprint image conforms to an average fingerprint pattern.

29. The method of claim 27, wherein the multi-function device is configured to operate as a pointer control device when the pattern parameter associated with the fingerprint image conforms to an average finger-tip pattern.

30. The method of claim 23, further comprising:

translating the position of the fingerprint image supplied to the detection surface of the detection array into a cursor position on an interface area of a display when the multi-function device is configured to operate as a pointer control device.

31. The method of claim 23, further comprising:

performing fingerprint authentication on the fingerprint image supplied to the detection surface of the detection array when the multi-function device is configured to operate as a fingerprint recognition device.

* * * * *